(12) United States Patent
Mache

(10) Patent No.: US 10,177,570 B2
(45) Date of Patent: Jan. 8, 2019

(54) REDUNDANT VOLTAGE SUPPLY DEVICE

(71) Applicant: DIEHL AEROSPACE GMBH,
Ueberlingen (DE)

(72) Inventor: Erik Mache, Herdwangen-Schoenach (DE)

(73) Assignee: DIEHL AEROSPACE GMBH,
Ueberlingen (DE)

( * ) Notice: Subject to any disclaimer, the term of this patent is extended or adjusted under 35 U.S.C. 154(b) by 188 days.

(21) Appl. No.: 15/502,343

(22) PCT Filed: Aug. 18, 2015

(86) PCT No.: PCT/EP2015/001693
§ 371 (c)(1),
(2) Date: Feb. 7, 2017

(87) PCT Pub. No.: WO2016/026571
PCT Pub. Date: Feb. 25, 2016

(65) Prior Publication Data
US 2017/0229862 A1 Aug. 10, 2017

(30) Foreign Application Priority Data

Aug. 21, 2014 (DE) .................. 10 2014 012 462

(51) Int. Cl.
*H02J 1/12* (2006.01)
*H02M 3/335* (2006.01)
(Continued)

(52) U.S. Cl.
CPC .............. *H02J 1/12* (2013.01); *G05F 1/253* (2013.01); *H02M 3/33576* (2013.01); *H02J 2001/008* (2013.01)

(58) Field of Classification Search
None
See application file for complete search history.

(56) References Cited

U.S. PATENT DOCUMENTS 4,558,230 A    12/1985  Western
5,949,667 A *  9/1999  Libert .................. G05F 1/59
323/272

(Continued)

FOREIGN PATENT DOCUMENTS

EP            2363947 A1    9/2011
WO     WO 80/00899 A1    5/1980

OTHER PUBLICATIONS

International Search Report dated Nov. 24, 2015 issued in PCT/EP2015/001693.

*Primary Examiner* — Jared Fureman
*Assistant Examiner* — James Evans
(74) *Attorney, Agent, or Firm* — Scully Scott Murphy and Presser; Frank DiGiglio

(57) ABSTRACT

A voltage supply device for an aircraft control device having a first and a second main channel arrangement for redundancy and reliability, wherein the voltage supply device has a first and a second output transformer, wherein a first output inductor of the first main channel arrangement is designed as a primary winding of the first output transformer, and the second output inductor of the second main channel arrangement is designed as a primary winding of the second output transformer; and wherein the voltage supply device has at least a first secondary channel arrangement, wherein the first secondary channel arrangement has a first secondary voltage output and a first secondary winding of the first output transformer and a first secondary winding of the second output transformer, wherein the first secondary voltage output is connected to the first secondary windings which are connected in parallel.

10 Claims, 3 Drawing Sheets

(51) Int. Cl.
*G05F 1/253* (2006.01)
*H02J 1/00* (2006.01)

(56) References Cited

U.S. PATENT DOCUMENTS

| 6,388,896 B1 * | 5/2002 | Cuk | H02M 3/1582 |
| | | | 363/16 |
| 2014/0028289 A1 * | 1/2014 | Ohnemus | H02M 3/3376 |
| | | | 324/127 |

\* cited by examiner

REDUNDANT VOLTAGE SUPPLY DEVICE

The present invention relates to a voltage supply device having a first and a second main channel arrangement, wherein the first main channel arrangement has a first voltage input for a first input DC voltage and a first main voltage output for a first output DC voltage, wherein the first main channel arrangement has a first DC/DC converter device for converting the first input DC voltage into the first output DC voltage, wherein the first DC/DC converter device has a first output inductor which is arranged in series with the first main voltage output, wherein the second main channel arrangement has a second voltage input for a second input DC voltage and a second main voltage output for a second output DC voltage, wherein the second main channel arrangement has a second DC/DC converter device for converting the second input DC voltage into the second output DC voltage, and wherein the second DC/DC converter device has a second output inductor which is arranged in series with the second main voltage output. The present invention furthermore relates to an aircraft control system including the aircraft control system, and a method for testing the voltage supply device and/or the aircraft control system.

Power supplies for supplying control devices for an aircraft are frequently designed to be redundant, so that the failure of individual operative parts of the voltage supply does not result in a complete failure of the voltage supply and thus the control device. The background of this approach is that the failure of such a control device could result in serious consequences for the aircraft.

For example, the publication U.S. Pat. No. 4,558,230 discloses a voltage supply for an aircraft control device, wherein the voltage supply provides multiple outputs. However, the use of two voltage supplies forms the simplest option for a redundant voltage supply. Such a structure is assumed to be the closest related art.

The object of the present invention is to provide a voltage supply device functioning in an operationally reliable manner in particular for an aircraft control device, having a manageable number of components. This object is achieved via a voltage supply device having the features of claim 1, via an aircraft control system including this voltage supply having the features of claim 9, and via a method for testing the voltage supply device and/or the aircraft control system having the features of claim 10. Preferred or advantageous specific embodiments of the present invention result from the subclaims, the following description, and the attached figures.

Thus, within the scope of the present invention, a voltage supply device is provided which is suitable and/or designed for an aircraft control device. In particular, the voltage supply device provides at least one supply voltage, which may be used by the aircraft control device.

The voltage supply device comprises a first and a second main channel arrangement. In particular, the first and second main channel arrangements are formed independently of one another.

The first main channel arrangement includes a first voltage input for a first input DC voltage. In particular, the input DC voltage is provided by an on-board electrical system of the aircraft. Furthermore, the first main channel arrangement has a first main voltage output for a first output DC voltage as a first supply voltage. The first main channel arrangement includes a first DC/DC converter device, which is designed for converting the first input DC voltage into the first output DC voltage. Preferred embodiments of the DC/DC converter device are described below. In the most general instance of the present invention, the first or additional DC/DC converter device(s) may, for example, be designed as step-up converters, step-down converters, or step up-step down converters. Particularly preferably, the first DC/DC converter device or additional DC/DC converter devices are designed as switching power supplies. The first DC/DC converter device has a first output inductor which is arranged in series with the first main voltage output. The output inductor is used in particular for the temporary intermediate storage of the electrical energy in a resonant operating mode of the DC/DC converter device.

The second main channel arrangement has a second voltage input for a second input DC voltage. Preferably, the second input DC voltage is provided by an on-board electrical system of the aircraft. The second input DC voltage may be identical to the first input DC voltage, so that the first and second voltage inputs are connected in parallel. Alternatively and preferably, the first and second input DC voltages are formed independently of one another, so that the input DC voltages are redundant with respect to one other. Furthermore, the second main channel arrangement has a second main voltage output for a second output DC voltage. The second output DC voltage forms a second supply voltage. The second main channel arrangement has a second DC/DC converter device for converting the second input DC voltage into the second output DC voltage. For the design of the second DC/DC converter device, reference is made to the variants of the first DC/DC converter device. The second DC/DC converter device includes a second output inductor which is arranged in series with the second main voltage output. The second output inductor is used in particular for the temporary storage of electrical energy during resonant operation of the DC/DC converter device.

Thus, the voltage supply device having the first and the second main channel arrangement has two channels which are preferably independent of one other, so that the two channels are redundant with respect to one other.

Within the scope of the present invention, it is provided that the voltage supply device has a first and a second output transformer. The first output inductor is designed as a primary winding of the first output transformer, and the second output inductor is designed as a primary winding of the second output transformer. In principle, it is known to implement the output inductors as coils; however, the implementation as a primary winding of an output transformer forms an equivalent alternative from the point of view of the electrical functionality.

Furthermore, the voltage supply device has at least a first secondary channel arrangement, wherein the first secondary channel arrangement has a first secondary voltage output for outputting a first secondary output DC voltage, wherein the first secondary output DC voltage forms a third supply voltage. A first secondary winding of the first output transformer and a first secondary winding of the second output transformer are connected in parallel with one another, wherein the first secondary voltage output is connected to the first secondary windings which are connected in parallel. Thus, one output of each of the first secondary windings is connected to the other, and they are connected in series with the first secondary voltage output. Each of the second outputs of the secondary winding is preferably grounded.

Electrical energy is transmitted from the primary windings to the secondary windings via the two output transformers. Due to the parallel connection of the secondary windings, it is achieved that the first secondary channel arrangement is always able to supply the first secondary output DC voltage in the case that both main channel arrangements are provided with an input DC voltage or are operational, or in the case that the first secondary output DC voltage is provided if one of the main channel arrangements fails. As a result of the two secondary windings being connected in parallel with one other, there is no voltage change in the first secondary output DC voltage if one of the main channel arrangements fails. Thus, the first secondary channel arrangement is designed to be disturbance-free, since it supplies the secondary output DC voltage if only one or exactly one of the main channel arrangements is in operation.

With the aid of the galvanic decoupling between the secondary channel arrangement and the first and second main channel arrangements, it is furthermore achieved that the first secondary channel arrangement is also not disturbed if a short circuit occurs in one of the main channel arrangements. Conversely, the same applies if a short circuit occurs in the secondary channel arrangement; thus, this short circuit does not affect the functionality of the main channel arrangements so severely that they would also fail.

In one preferred embodiment of the present invention, it is provided that the first secondary winding of the first output transformer and/or the first secondary winding of the second output transformer are loosely magnetically coupled to the respective output transformer and/or to the respective primary winding.

In particular, a coupling factor k<0.9, specifically, <0.5, is formed. As a result of the loose magnetic coupling between the first secondary winding of the first output transformer and its primary winding, and/or the first secondary winding of the second output transformer and its primary winding, the short-circuit withstand strength of the voltage supply device is improved.

In one preferred refinement of the present invention, the first secondary winding of the first output transformer and/or the first secondary winding of the second output transformer has an air gap. Thus, the secondary windings behave like source impedances, which have a high impedance in the case of dynamic loading, due to the air gap in the core. Due to the dynamic behavior of the secondary windings as source impedances, it is achieved that a short-circuit current flowing through the secondary windings is limited to a maximum value. However, since the current has a high inductive component, power dissipation is hardly generated. The current consumption of the associated DC/DC converter device is thus automatically reduced during the short circuit; the other outputs are not affected. In particular, the dynamic impedance is greater than the static impedance of the secondary winding.

In one preferred design of the present invention, the first and/or the second output transformer are equipped with an E-core, wherein the E-core has a center leg and at least one outer leg. Preferably, the E-core has one center leg and two outer legs. The primary winding is arranged on the center leg; the secondary winding has a first secondary winding section which is arranged on the center leg, and a second secondary winding section which is arranged on the outer leg. Due to the bifurcation of the secondary winding, the previously described air gap is formed, which improves the short-circuit withstand strength of the voltage supply in the respective output transformer.

In one preferred refinement of the present invention, the voltage supply device has a second secondary channel arrangement, wherein the second secondary channel arrangement supplies a second secondary voltage output with a second secondary output DC voltage as a fourth supply voltage. A second secondary winding of the first output transformer and a second secondary winding of the second output transformer are connected in parallel with one other, wherein the second secondary voltage output is connected to the second secondary windings which are connected in parallel. Thus, the second secondary channel arrangement is designed analogously to the first secondary channel arrangement, wherein, with regard to preferred embodiments or possible variants of the second secondary channel arrangement, reference is made to the description of the first secondary channel arrangement.

In one preferred circuit embodiment, a first diode device is upstream of the first secondary voltage output, and/or a second diode device is upstream of the second secondary voltage output. The diode devices are used to allow only a DC voltage component at the secondary voltage outputs.

For reducing the ripple in the secondary output DC voltages, it is provided that the first secondary voltage output is connected to ground via a first capacitor device, and/or that the second secondary voltage output is connected to ground via a second capacitor device. The capacitor devices function as a temporary energy store, so that oscillations formed in the voltage supply device due to the switching operations are filtered out.

In one preferred implementation of the present invention, at least one, preferably both, DC/DC converter devices, are designed as a single-ended flow converter device. Such a single-ended flow converter device has a first or second interstage transformer, wherein an input circuit is arranged on the primary side of the interstage transformer, and an output circuit is arranged on the secondary side of the interstage transformer. The input circuit comprises the first or second voltage input, the primary winding of the first or the second interstage transformer, and a first or second switching device which interrupts the input circuit as a function of a control signal, in particular as a function of a pulse width-modulated control signal. The output circuit comprises a secondary winding of the first or second interstage transformer, a rectifier area, and the first or second output inductor.

Additional subject matter relates to an aircraft control system including the voltage supply device as previously described, or according to one of the preceding claims. The aircraft control system includes a power supply network, wherein the power supply network provides the first input DC voltage and the second input DC voltage and delivers them to the voltage supply device at the first or second voltage input. Preferably, the first input DC voltage and the second input DC voltage are formed independently of one other. Furthermore, the aircraft control system includes an aircraft control computer as an aircraft control device, which is supplied with one or multiple supply voltages by the voltage supply device.

Additional subject matter of the present invention relates to a method for testing the voltage supply device and/or the aircraft control system as previously described, or according to one of the preceding claims, wherein in a first step, the first input DC voltage is deactivated, and the second input DC voltage is activated and tested to determine whether a supply voltage is present at the first and/or at the second secondary voltage output; subsequently, the first input DC voltage is activated, and the second input DC voltage is deactivated and also tested for whether a supply voltage is present at the secondary voltage outputs.

On the one hand, the advantage of the previously described voltage supply device is that in terms of the basic structure, at least the secondary voltage outputs are designed redundantly, so that they remain operational even if any one of the input DC voltages fails.

Furthermore, the voltage supply device is in particular short circuit-proof due to the loose magnetic coupling and/or the design having the air gap and/or the design having the two secondary winding sections, since a short circuit at any of the outputs, in particular the main voltage outputs and the secondary voltage outputs, does not affect the remaining outputs. In addition, the redundant voltage supply device may be designed to have few components, in particular to be without extensive monitoring electronics. Last but not least, an advantage lies in the fact that the functionality of the secondary voltage outputs may be tested without deactivating the secondary voltage outputs.

Additional features, advantages and effects of the present invention result from the description of a preferred exemplary embodiment of the present invention and the included figures. The following are shown:

Figure 1:
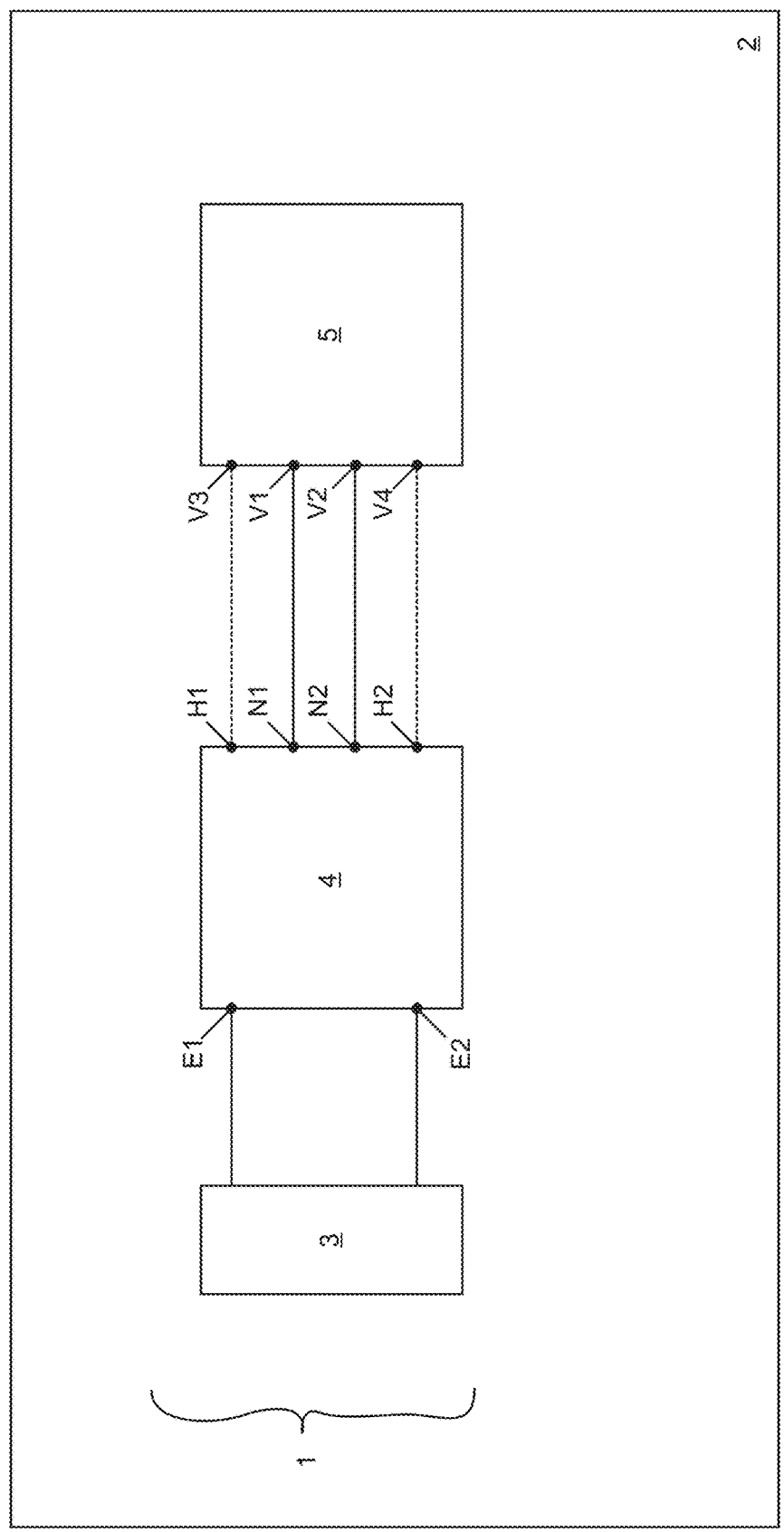
FIG. 1 shows a schematic block diagram of an aircraft control system including a voltage supply device, as an exemplary embodiment of the present invention.

FIG. 1 shows a schematic block representation of an aircraft control system 1 for an aircraft 2. The aircraft control system 1 comprises an on-board electrical system 3, a voltage supply device 4, and an aircraft control device 5. The on-board electrical system 3 provides two input voltages for a first voltage input E1 and a second voltage input E2 to the voltage supply device 4.

The input voltages are formed as input DC voltages. The voltage supply device 4 converts the input voltages and provides a total of four supply voltages at outputs of the voltage supply device 4. More precisely, there is a first main voltage output H1, a second main voltage output H2, a first secondary voltage output N1, and a second secondary voltage output N2.

Matching these, the aircraft control device 5 has at least two power supply inputs V1 and V2 and, if necessary, additional power supply inputs V3 and V4, wherein, however, at least one supply voltage is used by the outputs H1, H2, N1, N2 for supplying the aircraft control device 5. In the present example, the secondary voltage outputs N1 and N2 are connected to the power supply inputs V1 and V2. The aircraft control device 5 is, for example, designed as an aircraft control computer and is used in particular for controlling the aircraft 2.

The aircraft control system 1 is designed in such a way that in the case of the failure of a subcomponent, the voltage supply of the aircraft control device 5 with at least one supply voltage is still ensured. Thus, the voltage supply device 4 is configured in such a way that one of the input voltages could fail, and the aircraft control device 5 would nonetheless still be supplied with a supply voltage.

Figure 2:
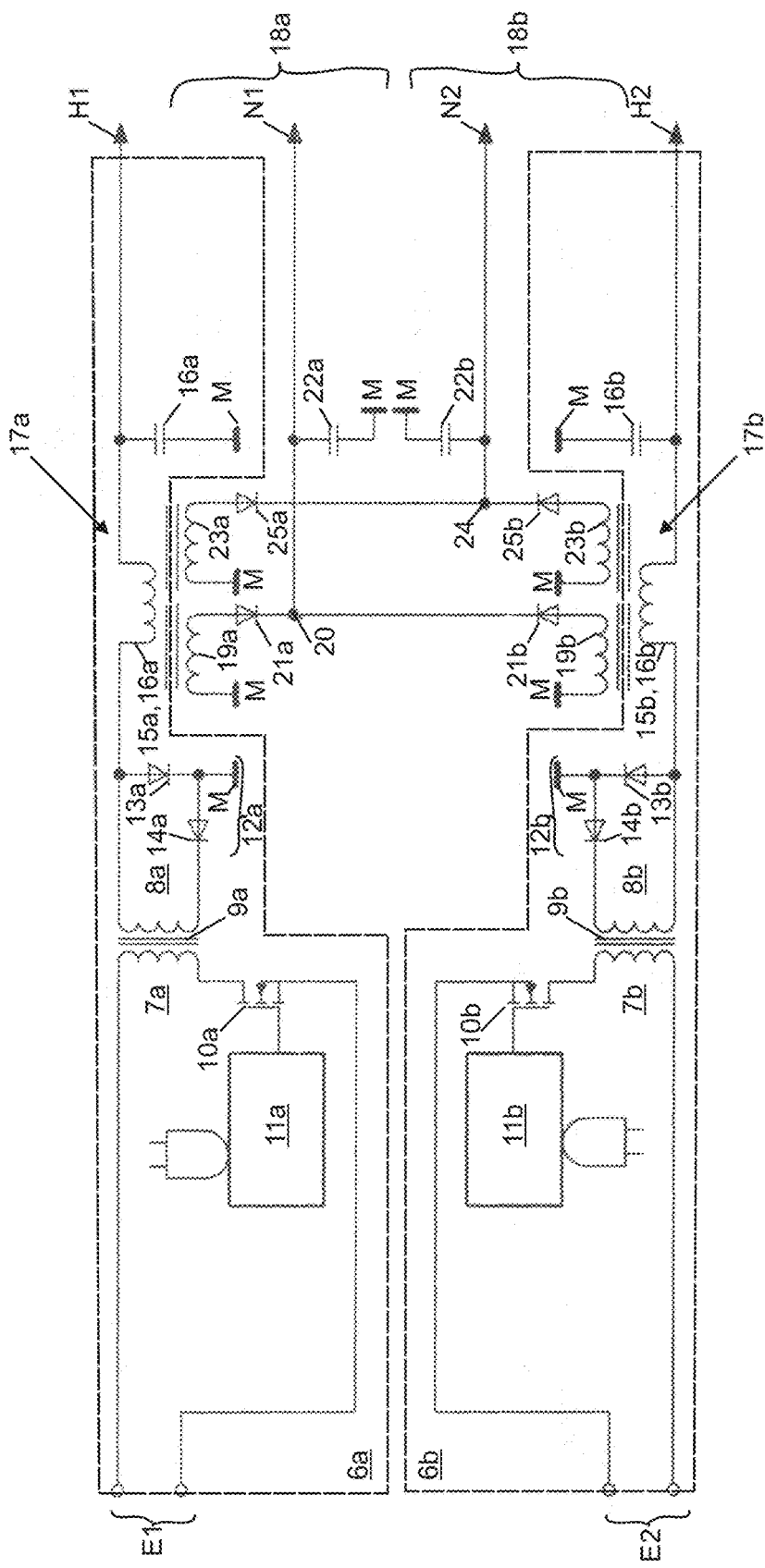
FIG. 2 shows a schematic diagram of the voltage supply device in FIG. 1.

FIG. 2 show a highly schematized view of the voltage supply device 4 having the first main voltage input E1 and the second main voltage input E2. Furthermore, the two main voltage outputs H1 and H2 and the secondary voltage outputs N1 and N2 are depicted.

Viewed structurally, the voltage supply device 4 has a first main channel arrangement 6a and a second main channel arrangement 6b. The first main channel arrangement 6a is formed through the conversion of the first input DC voltage at the first voltage input E1 into the first output DC voltage at the first main voltage output H1. The second main channel arrangement 6b is formed through the conversion of the second input DC voltage at the second voltage input E2 into the second output DC voltage at the second main voltage output H2. The first main channel arrangement 6a and the second main channel arrangement 6b are designed identically, so that only the first main channel arrangement 6a is described below.

The first main channel arrangement 6a has a first input circuit 7a and a first output circuit 8a. The first input circuit 7a and the first output circuit 8a are coupled to one another via a first interstage transformer 9a. In the first input circuit 7a, a switching device 10a is in series with a primary winding of the first interstage transformer 9a, which, for example, is designed as a transistor, in particular as a high-power transistor. The switching device 10a is controlled via a control device 11a. For example, the switching device 10a is controlled via a pulse width-modulated signal.

The first output circuit 8a has a secondary winding at the first interstage transformer 9a. A diode arrangement 12a is provided downstream, wherein a first output of the secondary winding of the interstage transformer 9a is routed to ground via a first diode 13a in the forward direction, and the second output of the secondary winding of the interstage transformer 9a is also routed to ground via a second diode 14a in the reverse direction. An output inductor 15a, which is arranged downstream from the first output of the secondary winding of the first interstage transformer 9a, acts as a temporary energy store.

The first output inductor 15a is connected in series with the first main voltage output H1. In addition, a first capacitor device 16a is arranged for smoothing the first output DC voltage, via which the first main voltage output H1 is connected to ground M.

The second main channel arrangement 6b is configured identically, the respective components, however, each being designated by the letter "b".

The first output inductor 15a is depicted by a primary winding 16a of a first output transformer 17a. The second output inductor 15b is depicted by a primary winding 16b of a second output transformer 17b.

Furthermore, the voltage supply device 4 has a first secondary channel arrangement 18a and a second secondary channel arrangement 18b. The first secondary voltage output N1 is associated with the first secondary channel arrangement 18a, and the second secondary voltage output N2 is associated with the second secondary channel arrangement 18b.

The first secondary channel arrangement 18a includes a first secondary winding 19a of the first output transformer 17a and a first secondary winding 19b of the second output transformer 17b. The first secondary windings 19a, b are connected to ground M on one end. The second outputs of the first secondary windings 19a, b are interconnected at a node 20, wherein the node 20 is in series with the first secondary voltage output N1. Thus, the first secondary windings 19a, b are arranged in parallel with one other. Upstream of the node 20, a diode device 21a, 21b is connected in the forward direction between the first secondary windings 19a, b and the node 20 in each case.

The secondary channel output N1 is connected via a capacitor device 22a to ground M in order to smooth the first secondary output DC voltage.

The second secondary channel arrangement 18b is formed via a second secondary winding 23a of the first output transformer 17a and via a second secondary winding 23b of the second output transformer 17b. One output of the second secondary windings 23a, b is connected to ground M in each case. The other outputs are connected via a node 24 to the second secondary voltage output N2. Upstream of the second node 24, diodes 25a, b are each connected in the forward direction, so that only the DC voltage component is allowed to pass through to the second secondary voltage output N2.

The second secondary voltage output N2 is connected via a capacitor device 22b to ground M in order to smooth the secondary output DC voltage.

The first and second secondary windings 19a, 23a at the first output transformer 17a are galvanically decoupled from one another. Likewise, the first secondary winding 19b and the second secondary winding 23b at the second output transformer 17b are galvanically decoupled from one another. Furthermore, the first and the second secondary windings 19a, 23a are decoupled from the primary winding of the first output transformer 17a. In addition, the first secondary winding 19b and the second secondary winding 23b are galvanically decoupled from the primary winding of the second output transformer 17b.

Via the depicted structure, the secondary voltage outputs N1, N2 are each supplied with electrical energy by the two output transformers 17a, b. As a result of the secondary windings 19a, b; 23a, b each being arranged electrically in parallel with one other in respective secondary channel arrangement 18a, b, one of the secondary windings 19a, 23a or 19b, 23b may be omitted in each case, without this resulting in a failure of the secondary channel arrangement 18a or 18b. Thus, the secondary channel arrangements 18a, b are designed to be fail-safe and/or redundant.

The primary winding 16a and the secondary windings 19a, 23a are only loosely coupled to one another via the first and second output transformers 17a, b. Similarly, in the second output transformer 17b, the primary winding is only loosely coupled to the first secondary winding 19b and the second secondary winding 23b. As a result of the loose coupling, it is achieved that a short circuit in one of the outputs H1, H2, N1, N2 would not result in a serious impairment of the other channels.

Figure 3:
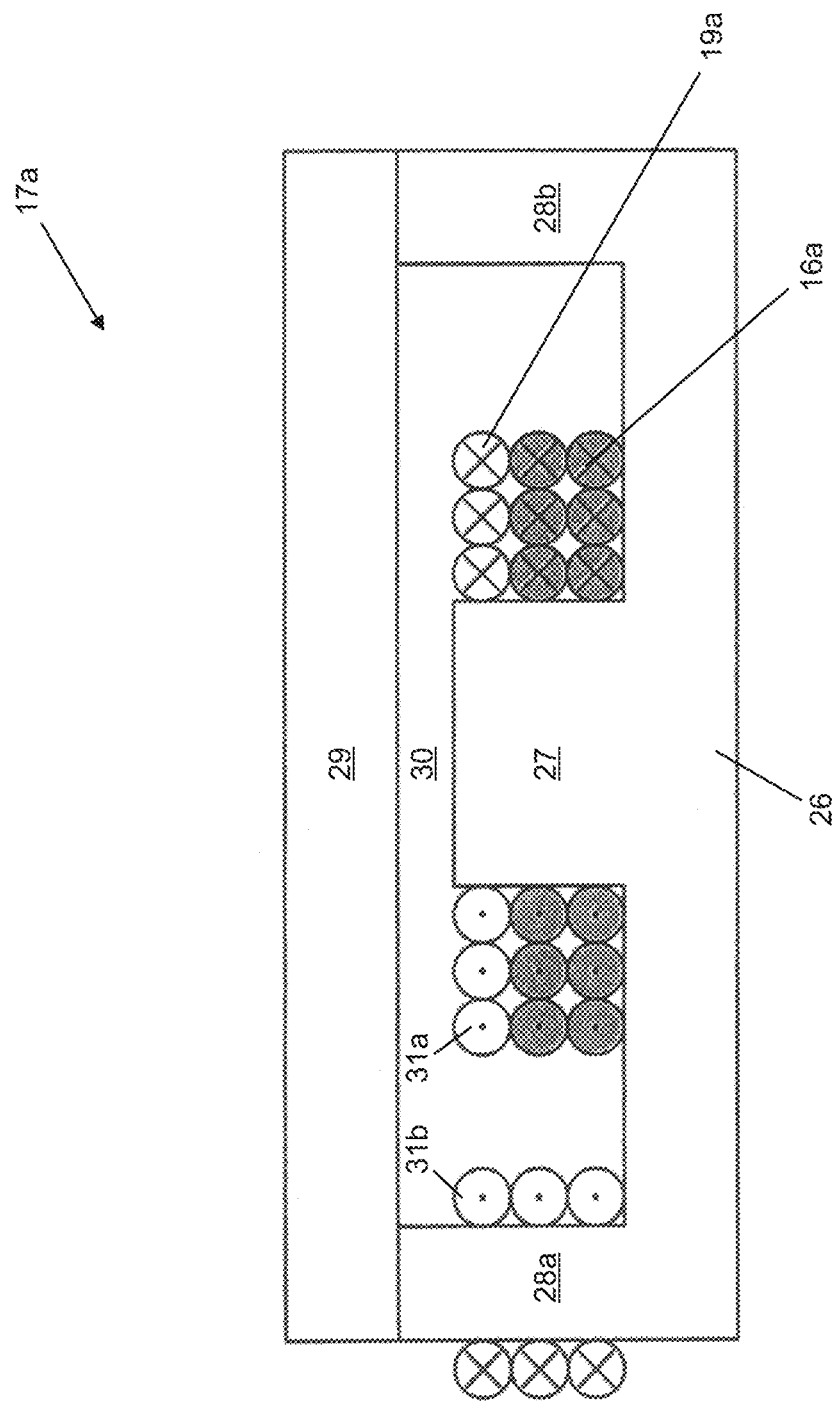
FIG. 3 shows a schematic cross-sectional view of one of the output transformers for describing the primary winding and the secondary winding in the output transformer.

This short-circuit withstand strength is furthermore achieved via the particular winding or winding arrangement in the output transformers 17a, b. FIG. 3 shows a schematic cross section through the output transformers 17a. The output transformer 17b is structured identically. FIG. 3 shows the primary winding 16a on the one hand, and the secondary winding 19a is on the other hand. The primary winding 16a is shadowed or dark; in contrast, the secondary winding 19a is depicted as white. The output transformer 17a has a core 26 which is designed as an E-core. The core 26 comprises a center leg 27 and two outer legs 28a, b. Furthermore, the core 26 is covered by an I-cross member 29, wherein, however, an air gap 30 is provided between the center leg 27 and the I-cross member 29.

The primary winding 16a is wound around the center leg 27. In this example, the secondary winding 19a is divided into two sections, i.e., into a first secondary winding section 31a which is also wound around the center leg 27, and into a second secondary winding section 31b which is wound around one of the two outer legs, in this example 28a.

This particular winding results in an inherent overload resistance of the output transformer 17a. As a result of the primary winding 16a being wound around the center leg 27 and the secondary winding 19a being divided into the first secondary winding section 31a and the second secondary winding section 31b, wherein the first secondary winding section 31a is also wound around the center leg 27 and the second secondary winding section 31b is wound around the outer leg 28b, it is made possible for the magnetic flux in the core 26 to realize a bypass path in the case of increasing loading of the secondary winding 19a. This structure behaves like a source impedance, which however, due to the air gap 30 in the core 26, is primarily inductive. Thus, the short-circuit current is limited to a maximum value. However, since the current has a high inductive component, power dissipation is hardly generated. The current consumption of the associated main channel arrangement 6a is reduced automatically during the short circuit. The other outputs are not affected.

Thus, the voltage supply device 4 has the advantage that the two secondary voltage outputs N1 and N2 are coupled with the two main voltage inputs E1, E2 via a particular winding, in particular winding arrangement, and are accordingly designed to be redundant. As a result of the particular winding arrangement, they are also independent of one other. Thus, a short circuit in the secondary voltage output N1 has an effect on the other outputs. No additional components are needed to achieve this independence. In order to detect the failure in a diode 21a, 21b, 25a, 25b in the secondary coupling arrangements 18a, b, the main channel arrangements 6a, b, in particular their voltage supply, may be disconnected individually. This approach allows testing the supply voltage device 4 and thus the aircraft control system 1, even during the operation of the aircraft control system 1.

LIST OF REFERENCE NUMERALS

1 Aircraft control system
2 Aircraft
3 On-board electrical system
4 Power supply device
5 Aircraft control device
6a, b Main channel arrangement
7a, b Input circuit
8a, b Output circuit
9a, b Interstage transformer
10a, b Switching device
11a, b Control device
12a, b Diode arrangement
13a, b First diode
14a, b Second diode
15a, b Output inductors
16a, b Capacitor device
16a, b Primary windings
17a, b Output transformers
18a, b Secondary channel arrangements
19a, b First secondary windings
20 Node
21a, b Diode device
22a, b Capacitor devices
23a, b Second secondary windings
24 Node
25a, b Diodes
26 Core
27 Center leg
28a, b Outer legs
29 I-cross member
30 Air gap 31a, b Secondary winding sections
E1, E2 Voltage inputs
H1, H2 Main voltage outputs
N1, N2 Secondary voltage outputs
V1 to V4 Power supply inputs
M Ground

The invention claimed is:

1. A voltage supply device
having a first and a second main channel arrangement,
wherein the first main channel arrangement has a first voltage input (E1) for a first input DC voltage and a first main voltage output (H1) for a first output DC voltage, wherein the first main channel arrangement has a first DC/DC converter device for converting the first input DC voltage into the first output DC voltage, wherein the first DC/DC converter device has a first output inductor which is arranged in series with the first main voltage output (H1),
wherein the second main channel arrangement has a second voltage input (E2) for a second input DC voltage and a second main voltage output (H2) for a second output DC voltage, wherein the second main channel arrangement has a second DC/DC converter device for converting the second input DC voltage into the second output DC voltage, wherein the second DC/DC converter device has a second output inductor which is arranged in series with the second main voltage output (H2),
wherein
the voltage supply device has a first and a second output transformer, wherein the first output inductor is designed as a primary winding of the first output transformer, and the second output inductor is designed as a primary winding of the second output transformer;
and in that the voltage supply device has at least a first secondary channel arrangement, wherein the first secondary channel arrangement has a first secondary voltage output (N1) and a first secondary winding of the first output transformer and a first secondary winding of the second output transformer,
wherein the first secondary voltage output (N1) is connected to the first secondary windings which are connected in parallel.

2. The voltage supply device as claimed in claim 1, wherein the first secondary winding of the first output transformer is loosely magnetically coupled with its primary winding, and/or the first secondary winding of the second output transformer is loosely magnetically coupled with its primary winding, and/or in that the second secondary winding of the first output transformer is loosely magnetically coupled with its primary winding, and/or the second secondary winding of the second output transformer is loosely magnetically coupled with its primary winding.

3. The voltage supply device as claimed in claim 1, wherein the first secondary winding of the first output transformer and/or the first secondary winding of the second output transformer have an air gap, and/or in that the second secondary winding of the first output transformer and/or the second secondary winding of the second output transformer have an air gap.

4. The voltage supply device as claimed in claim 1, wherein the first and/or second output transformer have an E-core having a center leg and at least one outer leg, wherein the primary winding is arranged on the center leg, and wherein the secondary winding has a first secondary winding section which is arranged on the center leg, and has a second secondary winding section which is arranged on the outer leg.

5. The voltage supply device as claimed in claim 1, wherein the voltage supply device has a second secondary channel arrangement, wherein the second secondary channel arrangement has a second secondary voltage output (N2) and a second secondary winding of the first output transformer and a second secondary winding of the second output transformer, wherein the second secondary voltage output (N2) is connected to the second secondary windings which are connected in parallel.

6. The voltage supply device as claimed in claim 1, wherein a first diode device is upstream of the first secondary voltage output (N1), and/or a second diode device is upstream of the second secondary voltage output (N2).

7. The voltage supply device as claimed in claim 1, wherein the first secondary voltage output (N1) is connected to ground (M) via a first capacitor device, and/or the second secondary voltage output (N2) is connected to ground (M) via a second capacitor device.

8. The voltage supply device as claimed in claim 1, wherein the DC/DC converter device is designed as a single-ended flow converter device.

9. An aircraft control system including a voltage supply device as claimed in claim 1, having a power supply network, wherein the power supply network provides the first input DC voltage and the second input DC voltage; including an aircraft control device, wherein the aircraft control device is supplied with at least one supply voltage by the voltage supply device.

10. A method for testing the voltage supply device as claimed in claim 1 or the aircraft control system the aircraft control system of claim 9 including said voltage supply device wherein in a first step, the first input DC voltage is deactivated, and the second input DC voltage is activated and tested to determine whether a supply voltage is present at the first and/or at the second secondary voltage output (N1, N2); subsequently, the first input DC voltage is activated, and the second input DC voltage is deactivated and also tested for whether a supply voltage is present at the secondary voltage outputs (N1, N2).

* * * * *